United States Patent
Welchel et al.

(10) Patent No.: US 6,286,145 B1
(45) Date of Patent: *Sep. 11, 2001

(54) BREATHABLE COMPOSITE BARRIER FABRIC AND PROTECTIVE GARMENTS MADE THEREOF

(75) Inventors: Debra Nell Welchel; Alan Edward Wright, both of Woodstock; Mary Lucille DeLucia, Roswell, all of GA (US)

(73) Assignee: Kimberly-Clark Worldwide, Inc., Neenah, WI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/469,684

(22) Filed: Dec. 22, 1999

(51) Int. Cl.⁷ .............................. A41D 13/02; B32B 5/26; A61F 5/37
(52) U.S. Cl. .............................. 2/69; 2/79; 2/82; 442/381; 128/873
(58) Field of Search .................................. 2/457, 69, 82, 2/87, 93, 97, 904; 604/380; 442/57, 382, 389

(56) References Cited

U.S. PATENT DOCUMENTS

| | | | |
|---|---|---|---|
| 4,683,593 | 8/1987 | Langley | 2/82 |
| 4,778,460 * | 10/1988 | Braun et al. | 604/380 |
| 5,059,277 | 10/1991 | Willhite, Jr. et al. | 156/580.1 |
| 5,169,712 | 12/1992 | Tapp | 428/315.5 |
| 5,393,599 | 2/1995 | Quantrille et al. | 428/284 |
| 5,409,761 | 4/1995 | Langley | 428/198 |
| 5,484,645 * | 1/1996 | Lickfield et al. | 428/198 |
| 5,509,142 * | 4/1996 | Connell et al. | 2/79 |
| 5,534,339 | 7/1996 | Stokes . | |
| 5,536,555 | 7/1996 | Zelazoski et al. | 428/138 |
| 5,545,464 * | 8/1996 | Stokes | 428/198 |
| 5,547,746 | 8/1996 | Burton . | |
| 5,560,974 | 10/1996 | Langley | 428/198 |
| 5,605,739 | 2/1997 | Stokes et al. | 428/198 |
| 5,607,798 | 3/1997 | Kobylivker et al. . | |
| 5,626,947 * | 5/1997 | Hauer et al. | 428/195 |
| 5,662,978 | 9/1997 | Brown et al. . | |
| 5,681,646 | 10/1997 | Ofosu et al. . | |
| 5,939,341 | 8/1999 | Brown et al. . | |
| 6,020,277 | 2/2000 | Jameson . | |
| 6,046,118 * | 4/2000 | Jones et al. | 442/57 |
| 6,100,208 | 8/2000 | Brown et al. . | |

* cited by examiner

*Primary Examiner*—John J. Calvert
*Assistant Examiner*—Robert H. Muromoto, Jr.
(74) *Attorney, Agent, or Firm*—Karl V. Sidor

(57) ABSTRACT

A breathable composite barrier fabric for protective garments including a low-strength nonwoven web; a high-strength nonwoven web containing multicomponent fibers that have a first polyolefin component and a second polyamide component, the high-strength web having a grab tensile strength of at least 1.5 times the low strength web; and a water impermeable barrier layer positioned between the low-strength web and high-strength web, the webs and barrier layer being joined by thermal bonding. Protective garments may be constructed from the breathable composite barrier fabrics. The low-strength nonwoven web is on the bodyside of the garment and the high-strength nonwoven web is on the exterior of the garment.

22 Claims, 3 Drawing Sheets

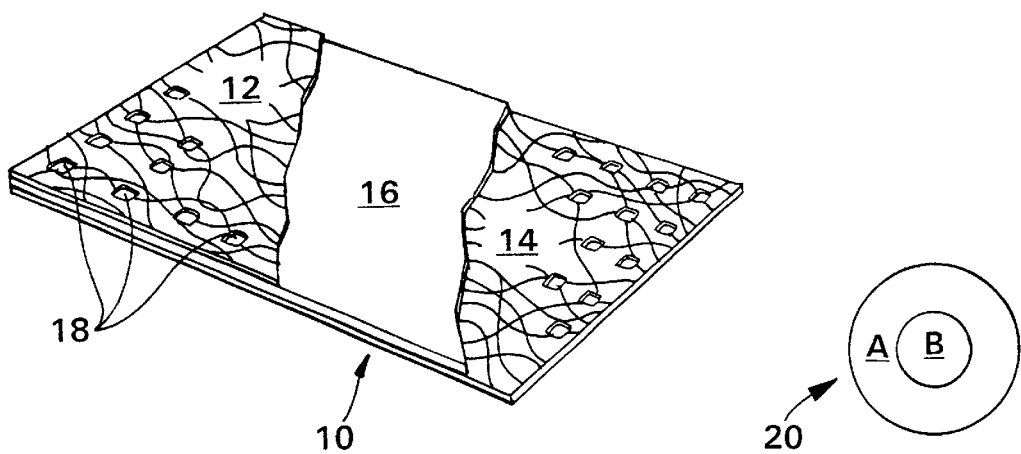
FIG. 1
FIG. 2
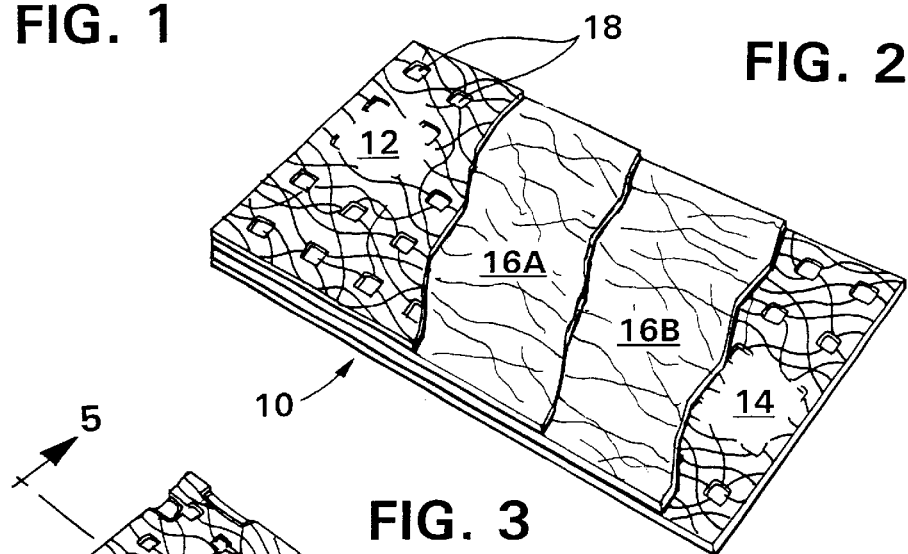
FIG. 3
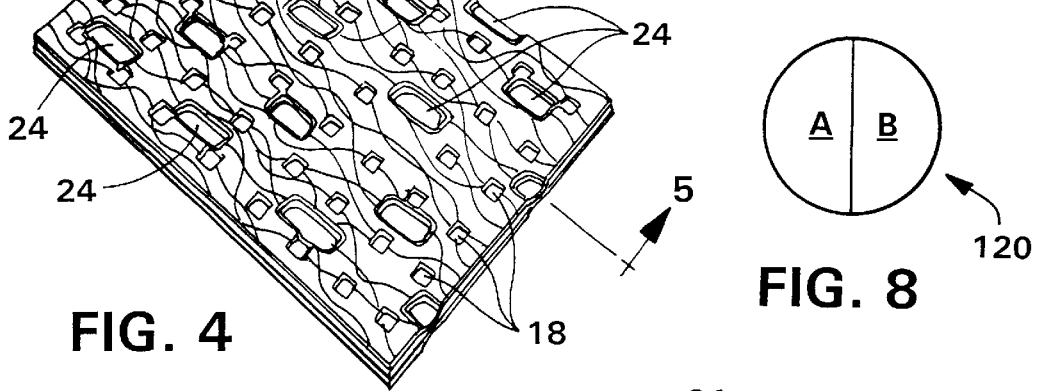
FIG. 4
FIG. 8
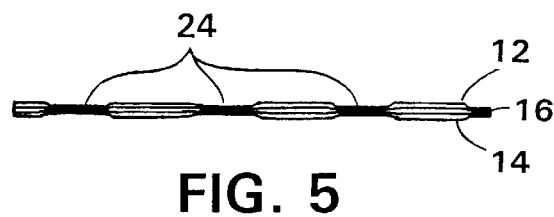
FIG. 5

BREATHABLE COMPOSITE BARRIER FABRIC AND PROTECTIVE GARMENTS MADE THEREOF

FIELD OF THE INVENTION

The present invention generally relates to nonwoven fabrics used to make protective garments and protective garments made thereof. More particularly, the present invention relates to breathable nonwoven fabrics having a plurality of layers and protective garments made thereof.

BACKGROUND OF THE INVENTION

Protective garments or apparel is generally worn in industrial settings, although it may be worn in other environments, such as hospitals, health-care facilities, farms, food processing plants, accident sites, hazardous waste sites, homes or anywhere a person may encounter pathogens, chemicals, dusts, smoke or irritants. These garments are exposed to a variety of hazards, and as a result, typically require sufficient strength to resist tears, rips and puncture.

Materials used to manufacture these garments are often designed to act as a barrier to liquids thereby providing protection from industrial chemicals, pathogens, irritants and the like. In this regard, some fabrics have the ability to act as a barrier to liquids while at the same time remaining "breathable" in the sense that water vapor may pass through the fabric. Breathable materials are often desired in many products such as, for example, in industrial workwear garments because a breathable garment helps prevent the build-up of moisture next to the worker's body, and thus, are generally more comfortable to wear than similar non-breathable apparel. A barrier layer that may be a breathable film or a very fine fiber nonwoven web can provide the breathable barrier properties. However, as the level of breathability increases the strength of the barrier layer typically decreases. Moreover, breathable barrier layers are often materials that have little inherent strength. They tend to be very fragile or easily damaged by abrasion, stretching and/or tearing forces. Additionally, the breathable barrier layers are often heat sensitive and are difficult to thermally bond to other higher-strength materials. Adhesives may be used to join breathable barrier layers with other materials. Unfortunately, adhesives tend to be expensive, may reduce breathability, can lose adhesion when exposed to certain solvents or environments, and may require heat curing that can thermally damage sensitive films. Thus, many breathable fabrics fail to provide sufficient barrier properties and are prone to leak when subjected to intense rain, abrasion, stretching or other harsh conditions.

Accordingly, a fabric that has sufficient strength and provides sufficient breathability and barrier properties will be an improvement over conventional fabrics used in personal protective garments.

DEFINITIONS

As used herein, the term "comprises" refers to a part or parts of a whole, but does not exclude other parts. That is, the term "comprises" is open language that requires the presence of the recited element or structure or its equivalent, but does not exclude the presence of other elements or structures. The term "comprises" has the same meaning and is interchangeable with the terms "includes" and "has".

As used herein, the terms "liquid impermeable," "liquid impervious" or "barrier" refers to a material that does not allow a liquid, such as water, to readily pass therethrough. Such a material has a minimum hydrostatic head value of at least about 30 mbar. Hydrostatic head or hydrohead as used herein refers to a measure of the liquid barrier properties of a fabric. Hydrohead is measured using a hydrostatic pressure test that determines the resistance of nonwoven materials to penetration by water under low hydrostatic pressure. Generally speaking, the test procedure is in accordance with Method 5514-Federal Test Methods Standard No. 191A, AATCC Test Method 127-89 and INDA Test method 80-4-92, modified to include a screen support of standard synthetic fiber window screen material. A test head of a Textest FX-300 Hydrostatic Head Tester (Schmid Corp., Spartanburg, S.C.) is filled with purified water maintained at a temperature between about 60° F. and 85° F. (18.3° C. and 29.4° C.). The testing is conducted at normal ambient conditions (about 73° F. (23° C.) and about 50% relative humidity). An 8-inch×8-inch (20.3 cm×20.3 cm) square sample of the test material is placed such that the test head reservoir is covered completely. The sample is subjected to a standardized water pressure, increased at a constant rate until leakage is observed on the outer surface of the sample material. Hydrostatic pressure resistance is measured at the first sign of leakage in three separate areas of the sample. The test is repeated for five specimens of each sample material. The results are averaged for each specimen and recorded in millibars. A fabric with a higher hydrohead reading indicates it has a greater resistance to liquid penetration than a fabric with a lower hydrohead. Fabrics having a greater resistance to liquid penetration are generally thought to also have useful levels of resistance to penetration by particulates (e.g., dusts and powders or the like).

As used herein the term "UV stable" refers to a polymeric composition that retains at least 40% (corrected) of its tensile strength after 12 months of exposure. UV stability may be assessed by a South Florida test that may be conducted by exposing a nonwoven fabric to the sun with no backing in Miami, Fla. The samples face south at a 45-degree angle. Each cycle concludes with a modified tensile test to measure the degradation or change in strength of the fabric. This provides a measure of the durability of the fabric. Comparing the length of time the web retains at least 40% (corrected) of its tensile strength can assess the relative UV stability. The tensile strength of a fabric may be measured according to the ASTM test D-1682-64. In addition, calculation of corrected 40% tensile strength may be obtained by adding the sum of the months to 50, 40 and 30% retention of tensile strength and dividing by three.

As used herein, the term "breathable" refers to a material which is permeable to water vapor having a minimum "moisture vapor transmission rate" or MVTR of at least about 100 g/m²/24 hours. The MVTR of a fabric is also often generally referred to as the "water vapor transmission rate" or WVTR. Generally speaking, materials used in protective garments such as industrial workwear will desirably have a MVTR of greater than 1000 g/m²/24 hours. For example, useful fabrics will have a MVTR ranging from about 2000 to about 5000 g/m²/24 hours. Some fabrics may have MVTR values ranging as high as about 6000 or 7000 g/m²/24 hours. Even greater MVTR values are desirable if it does not compromise the barrier properties of the fabric.

As used herein, the term "nonwoven web" refers to a web that has a structure of individual fibers that are interlaid forming a matrix, but not in an identifiable repeating manner. Nonwoven webs have been, in the past, formed by a variety of processes known to those skilled in the art such as, for example, meltblowing, spunbonding, wet-forming and various bonded carded web processes.

As used herein, the term "spunbond web" refers to a web formed by extruding a molten thermoplastic material as filaments from a plurality of fine, usually circular, capillaries with the diameter of the extruded filaments then being rapidly reduced, for example, by fluid-drawing or other well known spunbonding mechanisms. The production of spunbond nonwoven webs is illustrated in patents such as Appel, et al., U.S. Pat. No. 4,340,563.

As used herein, the term "meltblown web" means a web having fibers formed by extruding a molten thermoplastic material through a plurality of fine, usually circular, die capillaries as molten fibers into a high-velocity gas (e.g. air) stream which attenuates the fibers of molten thermoplastic material to reduce their diameters. Thereafter, the meltblown fibers are carried by the high-velocity gas stream and are deposited on a collecting surface to form a web of randomly disbursed fibers. The meltblown process is well-known and is described in various patents and publications, including NRL Report 4364, "Manufacture of Super-Fine Organic Fibers" by V. A. Wendt, E. L. Boone, and C. D. Fluharty; NRL Report 5265, "An Improved Device for the Formation of Super-Fine Thermoplastic Fibers" by K. D. Lawrence, R. T. Lukas, and J. A. Young; and U.S. Pat. No. 3,849,241, issued Nov. 19, 1974, to Buntin, et al., which are hereby incorporated by reference.

As used herein, the term "fiber" refers to a fundamental solid form, usually semi-crystalline, characterized by relatively high tenacity and an extremely high ratio of length to diameter, such as several hundred to one. Exemplary natural fibers are wool, silk, cotton, and hemp. Exemplary semi-synthetic fibers include rayon. Exemplary synthetic fibers include spinneret extruded polyamides, polyesters, acrylics, and polyolefins.

As used herein the term "polymer" refers to a macromolecule formed by the chemical union of 5 or more identical combining units called monomers. Generally polymers include homopolymers, copolymers, such as for example, block, graft, random and alternating copolymers, terpolymers, etc., and blends and modifications thereof. Furthermore, the term "polymer" shall include all possible geometrical or spatial configurations of the molecule. These configurations include isotactic, syndiotactic and atactic symmetries.

As used herein, the term "hydrophilically transmuted" refers to the condition in which a conventionally hydrophobic material has been rendered hydrophilic or water wettable. This may be accomplished by modifying the surface energies of the hydrophobic material utilizing wetting agents and/or surface modification techniques. Generally speaking, materials such as, for example, fibers, filaments and/or fabrics (e.g., textile fabrics, woven fabrics and the like) formed of typically hydrophobic materials such as polyolefins may be rendered hydrophilic (i.e., water wettable) by use of internal wetting agents that migrate to the surface of the material, external wetting agents that are applied to the surface of the material, and/or surface modification techniques that alter the surface of the material.

As used herein the term "multicomponent fibers" refers to fibers that have been formed from at least two polymers. Such fibers may be extruded from separate extruders but spun together to form one fiber. Multicomponent fibers include conjugate and/or bicomponent fibers. The polymers are usually different from each other though conjugate fibers may have components including either similar or identical polymers. The polymers are arranged in substantially constantly positioned distinct zones across the cross-section of the multicomponent fibers and extend continuously along the length of the multicomponent fibers. Multicomponent fibers are taught in U.S. Pat. No. 5,108,820 to Kaneko et al., U.S. Pat. No. 4,795,668 to Krueger et al., U.S. Pat. No. 5,336,552 to Strack et al and U.S. Pat. No. 5,382,400 to Pike et al., the entire contents of which are incorporated herein by reference. For bicomponent fibers, the polymers may be present in ratios (by volume) of 75/25, 50/50, 25/75 or other desired ratios. Multicomponent fibers may also have various shapes such as, for example, those described in U.S. Pat. No. 5,277,976 to Hogle et al, U.S. Pat. Nos. 5,466,410 to Hills and 5,069,970 and 5,057,368 to Largman et al. hereby incorporated by reference. For purposes of the present invention, multicomponent fibers also encompass multiconstituent fibers that may be formed from a blend of polymers. For example, multiconstituent fibers may include bi-constitutient fibers such as those disclosed in U.S. Pat. No. 5,534,335 to DeLucia et al., the contents of which are incorporated herein by reference.

As used herein, the term "copolymer" refers to a polymer produced by the simultaneous polymerization of two or more dissimilar monomers. An exemplary copolymer includes a random copolymer (RCP) mixture of about 3 to about 5 weight percent ethylene monomers and about 95 to about 97 weight percent propylene monomers.

As used herein, the term "hot air knife" or "HAK" refers to a process of bonding a layer of fibers, particularly spunbond, in order to give the layer of fibers sufficient integrity or coherence for further processing. The hot air knife bonding process does not include or encompass relatively stronger bonding processes like through air bonding (TAB), thermal bonding and/or ultrasonic bonding. A hot air knife is a device that focuses a stream of heated air at a very high flow rate, generally from about 1000 to about 10000 feet per minute (fpm) (305 to 3050 meters per minute (m/min)), or more particularly from about 3000 to 5000 feet per minute (915 to 1525 m/min.) directed at the nonwoven web soon after its formation. The air temperature is usually in the range of the melting point of at least one of the polymers used in the web, generally between about 200 and 550° F. (93 and 290° C.) for the thermoplastic polymers commonly used in spunbonding. The control of air temperature, velocity, pressure, volume and other factors helps avoid damage to the web while increasing its integrity. The Hak's focused stream of air is arranged and directed by at least one slot of about ⅛ to 1 inches (3 to 25 mm) in width, particularly about ⅜ inch (9.4 mm), serving as the exit for the heated air towards the web, with the slot running in a substantially cross-machine direction over substantially the entire width of the web. In other embodiments, there may be a plurality of slots arranged next to each other or separated by a slight gap. The slot is usually, though not essentially, continuous, and may be comprised of, for example, closely spaced holes. The HAK may have a plenum to distribute and contain the heated air prior to its exiting the slot. The plenum pressure of the HAK is usually between about 1.0 and 12.0 inches of water (2 to 22 mm Hg), and the HAK is positioned between about 0.25 and 10 inches (6 and 254 mm) and more desirably 0.75 to 3.0 inches (19 to 76 mm) above the forming wire. In a particular embodiment the HAK plenum's cross sectional area for cross-directional flow (i.e. the plenum cross sectional area in the machine direction) is at least twice the total slot exit area. Since the foraminous wire onto which spunbond polymer is formed generally moves at a high rate of speed, the time of exposure of any particular part of the web to the air discharged from the hot air knife is often less a tenth of a second and frequently about a hundredth of a second in contrast with the through air bonding process which has a much larger dwell time. The HAK process has a great range of variability and controllability of many factors such as air temperature, velocity, pressure, volume, slot or hole arrangement and size, and the distance from the HAK plenum to the web. The HAK is further described in U.S. Pat. No. 5,707,468 to Arnold et al., granted Jan. 13, 1998 and commonly assigned, the entire contents of which are incorporated herein by reference.

As used herein, "through-air bonding" or "TAB" refers to a process of bonding a nonwoven conjugate fiber web in which heated air, which is sufficiently hot to melt one of the polymers of the multicomponent fibers, is forced through the web. The melting and resolidification of the polymer provides the bonding between the fibers to integrate the web. The air velocity is typically between 100 and 500 feet per minute (30 and 152 m/min) and the dwell time may be as long as 6 seconds. Through air bonding has relatively restricted variability and since through-air bonding requires the melting of at least one component to accomplish bonding, it is particularly useful in connection with webs of conjugate fibers or those which include an adhesive. In the through-air bonder, air having a temperature above the melting temperature of at least one of the exposed components is directed through the web and into a perforated roller supporting the web. Alternatively, the through-air bonder may be a flat arrangement wherein the air is directed vertically downward onto the web. The operating conditions of the two configurations are similar, the primary difference being the geometry of the web during bonding.

As used herein, "ultrasonic bonding" means a process performed, for example, by passing the fabric between a sonic horn and anvil roll as illustrated in U.S. Pat. No. 4,374,888 to Bornslaeger, the entire contents of which is incorporated herein by reference.

As used herein "point bonding" means bonding one or more layers of fabric at a plurality of discrete bond points. For example, thermal point bonding generally involves passing a fabric or web of fibers to be bonded between a heated roll assembly such as, for example, a heated calender roll and an anvil roll. The calender roll is usually patterned in some way so that the entire fabric is not bonded across its entire surface, and the anvil roll is usually smooth. As a result, various patterns for calender rolls have been developed for functional and/or aesthetic reasons. One example of a pattern has points and is the Hansen Pennings or "H&P" pattern with about a 30% bond area with about 200 bonds/square inch (31 bonds/square cm) as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern when new has a bonded area of about 29.5%. Another typical point bonding pattern is the expanded Hansen Pennings or "EHP" bond pattern which produces a 15% bond area when new with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches (0.584 mm), a spacing of 0.062 inches (1.575 mm) between pins, and a depth of bonding of 0.033 inches (0.838 mm). The resulting pattern has a bonded area of about 15% when new. Other common patterns include a diamond pattern with repeating and slightly offset diamonds with about a 16% bond area when new. Further, a wire weave pattern, which gives the nonwoven web a woven look, having a pin density of about 302 pins per square inch (47 pins per square cm) and resulting in a bonded area of about 17% when new. Typically, the percent bonding area varies from around 5% to around 30% of the area of the fabric laminate web. Spot bonding holds the laminate layers together as well as imparts integrity to each individual layer by bonding filaments and/or fibers within each layer without destroying the breathability or hand of the fabric.

As used herein, the term "fabric" refers to a woven or nonwoven material used in items such as protective covers, camper/trailer covers, tarpaulins, awnings, canopies, tents, agricultural covers and apparel such as head coverings, industrial work wear and coveralls, pants, shirts, jackets, gloves, socks, shoe coverings, and the like.

As used herein the term "protective cover" refers to a cover for vehicles such as cars, trucks, boats, airplanes, motorcycles, bicycles, golf carts, as well as covers for equipment often left outdoors like grills, yard and garden equipment, such as mowers and roto-tillers, lawn furniture, floor coverings, table cloths and picnic area covers.

As used herein, the term "peel strength" refers to the average force, expressed in grams (g), that is required to separate a bonded fabric at 180 degree angle over a distance of two inches (five centimeters (cm)). A peel strength test is described in the Test Procedures portion of this document.

As used herein, the term "delamination" refers to the separation of the plies of a laminated fabric due to a failure of the bonding mechanism.

As used herein, the term "bond strength" refers to the average peel force required to separate the component layers of a specimen under specified conditions.

SUMMARY OF THE INVENTION

The problems and needs described above are addressed by the present invention, which provides a breathable composite barrier fabric for protective garments including a low-strength nonwoven web; a high-strength nonwoven web containing multicomponent fibers that have a first polyolefin component and a second polyamide component and a water/liquid impermeable barrier layer positioned between the low-strength web and high-strength web, the webs and barrier layer being joined by thermal bonding. According to the invention, the high-strength web has a grab tensile strength of at least 1.5 times the low strength web.

Protective garments may be constructed from the breathable composite barrier fabrics. The low-strength nonwoven web is on the bodyside of the garment and the high-strength nonwoven web is on the exterior of the garment.

According to the invention the low-strength web may be selected from spunbond webs, meltblown fiber webs, bonded carded webs, coform webs and combinations thereof. The low-strength web may be a nonwoven web including multicomponent fibers having a sheath component and a core component. Alternatively and/or additionally, the low-strength web may be a nonwoven web including multicomponent fibers having a side-by-side configuration.

The low-strength nonwoven web may contain fibers composed entirely of a relatively low-melting polyethylene polymer composition. Alternatively and/or additionally, the low-strength nonwoven web may contain multicomponent fibers having a relatively low melting polyethylene polymer component. For example, the low-strength nonwoven web may contain multicomponent fibers having a sheath component and a core component, and specifically, the sheath component may be a polyethylene polymer composition and the core component may be a polypropylene polymer composition. The ratio of the sheath component to core component may be between about 75/25 and about 25/75, by volume, and more particularly, about 50/50, by volume. Of course, the ratios and description of components described above may apply to multicomponent fibers having a side-by-side configuration.

It is contemplated that the low-strength nonwoven web may be made of or may include fibers formed of a polypropylene polymer composition, or a copolymer composition. The copolymer composition may include about 3 to about 5 weight percent polyethylene and about 95 to about 97 weight percent polypropylene.

The high-strength web is a nonwoven web that desirably includes multicomponent fibers having a sheath component and a core component. The core component may be a polyamide such as any satisfactory nylon polymer and the sheath component may be a polyolefin. Alternatively and/or additionally, the high-strength web may be a nonwoven web including multicomponent fibers having a side-by-side configuration.

According to an aspect of the invention, the high-strength web has a grab tensile strength of from about 2 to about 15 times the low strength web. For example, the high-strength web may have a grab tensile strength of from about 3 to about 9 times the low-strength web. As yet another example, the high-strength web may have a grab tensile strength of from about 4 times the low-strength web.

According to the invention, the barrier layer may be a polyolefin meltblown web having a basis weight of at least about 10 grams per square meter (gsm). For example, the barrier layer may be a meltblown web having a basis weight of about 16.3 gsm. As another example, the barrier layer may be a meltblown web having a basis weight ranging from about 32 gsm to about 100 gsm.

The barrier layer may also be a breathable film. Desirably, the breathable film is a microporous polyolefin film such as, for example, a microporous polyethylene or polypropylene film. The breathable film may be a multilayer film having an outer polyethylene layer, or alternatively, a multilayered filled film. The breathable film may include a microporous film further including at least about 35% by weight filler particles and a polyethylene polymer composition. Furthermore, the breathable film may include a microporous copolymer film.

The layers of the breathable composite barrier fabric are joined by thermal bonding techniques such as, for example, conventional hot calendaring, ultrasonic bonding, point bonding, hot air techniques, radiant heating, infrared heating and the like.

The present invention encompasses a protective garment formed from the breathable composite barrier fabric described above. The protective garment may include: (1) a body portion having a neck opening in a shoulder line at its top; (2) two sleeve portions extending from the body portion, each sleeve portion having an inner edge and an outer edge; and (3) two leg portions extending from the body portion.

According to an aspect of the invention, the low-strength nonwoven web is on the bodyside of the garment and the high-strength nonwoven web is on the exterior of the garment. It is believed that the substantial difference in strength between the nonwoven webs (i.e., at least 1.5 times or 150%) and the location of the high-strength nonwoven web on the exterior of the garment provide unique properties that are particularly well-suited for breathable protective garments.

The present invention also encompasses a protective garment formed from the breathable composite barrier fabric described above wherein the garment includes: (1) a first body half and a second body half, said second body half being substantially a mirror image of said first body half, each said body half being composed of a seamless sheet of material wherein the low-strength nonwoven web is on the bodyside of the garment and the high-strength nonwoven web is on the exterior of the garment, and each body half including: (a) a body portion having a first and second edge and a top edge extending approximately half-way across the body portion from the top of the second edge; (b) a sleeve portion having a top and bottom sleeve edge, a top edge, and a segment of the second edge of the body portion; and (c) a leg portion having a front and rear leg edge; (2) closure means joining the first edges of each bodyportion of each body half; (3) a seam joining the second edges of the body portion, including the segment of the second edges in the sleeve portions, on each body half; (4) sleeve seams joining the top sleeve edges to the bottom sleeve edges on each body half; (5) inseams joining the front leg edges to the back leg edges on each body half; and (6) back seams joining each top edge of a sleeve portion with the top edge of its respective body portion on each body half.

In an aspect of the invention, the low-strength nonwoven web may be a hydrophobic nonwoven web that is hydrophilically transmuted utilizing an external wetting agent. The external wetting agent may be an applied surfactant treatment. The surfactant may be selected from anionic surfactants and cationic surfactants. Alternatively and/or additionally, the low-strength nonwoven web may be a hydrophobic nonwoven web that is hydrophilically transmuted by surface modification.

It is contemplated that one or more of the nonwoven webs used in the breathable composite barrier fabric may include an alcohol repellent treatment and/or or an anti-static treatment.

BRIEF DESCRIPTION OF THE DRAWINGS

FIG. 1 is a partially cut-away perspective view of a multilayer laminate of the present invention;

FIG. 2 is a cross-sectional view of a concentric sheath/core bicomponent fiber of the present invention;

FIG. 3 is a partially cut-away perspective view of an alternative embodiment of a multilayer laminate of the present invention;

FIG. 4 is a perspective view of the laminate of FIG. 1 illustrating a representative bond pattern;

FIG. 5 is a cross-sectional view of the laminate of FIG. 4 taken along lines 5—5;

FIG. 8 is a cross-sectional view of a side-by-side bicomponent fiber of the present invention.

DESCRIPTION OF THE PREFERRED EMBODIMENTS

Figure 6:
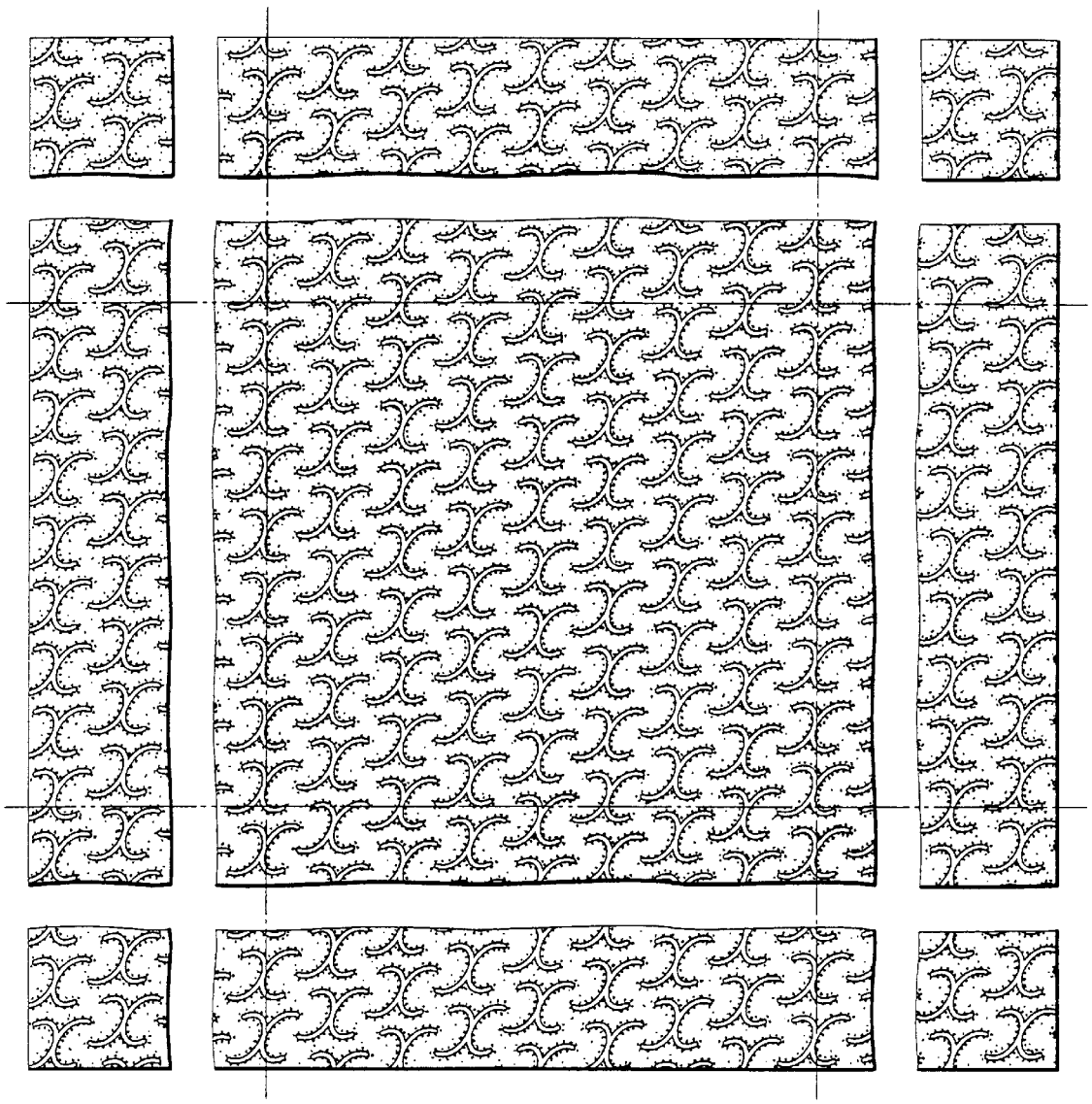
FIG. 6 is a schematic view of a representative bond pattern.

In reference to FIG. 1, fabrics of the present invention will be described in further detail. As illustrated, a breathable composite barrier fabric 10 includes a low-strength nonwoven web 12, a high-strength nonwoven web 14, and a barrier layer 16 positioned between the low-strength nonwoven web 12 and the high-strength nonwoven web 14. The low-strength nonwoven web 12 provides some limited support to the barrier layer 16 and may be constructed from materials to lower the cost of the breathable composite barrier fabric 10. The barrier layer 16 provides a water-impervious (i.e., liquid impervious) barrier, and the high-strength nonwoven web 14 provides the substantial portion of the strength and support to the barrier layer 16 and the overall breathable composite barrier fabric 10. Thus, the breathable composite barrier fabric 10 is used, for example, as the material to manufacture protective garments with the high-strength nonwoven web 14 facing the environment and the low-strength nonwoven web 12 facing the wearer. The low-strength nonwoven web 12 may have sufficient integrity and coherence to shield the barrier layer 16 from abrasion and wear caused by rubbing against the clothing or body of a person wearing the protective garment. The low-strength nonwoven web 12 may also serve to shield the barrier layer 16 during lamination.

While the breathable composite barrier fabric 10 may be made from a variety of materials, it desirably includes some polyolefin materials that have similar melting points. As an example, the barrier layer 16 may be constructed from polyethylene or polypropylene. Likewise, the low-strength and high-strength nonwoven webs 12 and 14 may be constructed from or may include fibers or fiber components made polyethylene or polypropylene. Desirably, a breathable composite barrier fabric 10 having a barrier layer 16 made from polyethylene would have low-strength and high-strength nonwoven webs 12 and 14 made from polyethylene fibers, or from fibers having a polyethylene exterior.

Alternatively, a breathable composite barrier fabric 10 having a barrier layer 16 made from polypropylene would have low-strength and high-strength nonwoven webs 12 and 14 made from polypropylene fiber, or from fibers having a polypropylene exterior. Having similar materials in all three layers aids the thermal bonding of the various webs and layers 12, 14 and 16 when forming the breathable composite barrier fabric 10.

The low-strength nonwoven web 12 includes an integrated layer of fibers, desirably an integrated nonwoven web of continuous fibers, which may be monocomponent or multicomponent fibers. In a desired embodiment, referring to FIG. 2, the fibers include sheath/core type multicomponent fibers having a first component "A" which envelops second component "B" and forms a peripheral surface along substantially the entire length of multicomponent fibers may be eccentric or concentric and it is desirable that the fibers include continuous filaments in which the enveloping component "A" forms the entire peripheral surface along the length of fiber 20. Similarly, although the multicomponent fibers may be eccentric or concentric in configuration, concentric bicomponent fibers are desired. As the orientation of the core component within the fiber may vary in many production methods, in order to ensure sufficient protection of the core component it is desirable that the sheath component include at least about 50% of the cross-sectional surface area of the fiber. The component "B" of the multicomponent fibers may include a structural component and desirably has good tensile strength. Although not shown, multicomponent fiber 20 need not be limited to two components.

Alternatively, the bicomponent fiber may be in a side-by-side configuration, as depicted in FIG 8. A fiber 120 has a first component "A" bonded to a second component "B". Desirably, the fiber 120 forms a substantially symmetrical structure where each component A and B forms a semicircle when viewing the fiber 120 in cross-section as depicted in FIG. 8. Alternatively, the fiber 120 may form an asymmetrical structure when viewing the fiber from a cross-section.

Suitable materials for the layer 12 may include polymers such as polyolefins, polyamides and polyesters. Desirably polymers such as polyethylene, linear low-density polyethylene, high-density polyethylene, polypropylene and blends and/or copolymers thereof are utilized. As an example, fibers used in the low-strength nonwoven web 12 may have a sheath/core configuration where the component A is a polyethylene and the component B is a polypropylene. Other examples may include monocomponent fibers made from polypropylene and random copolymers having about 3 to 5 weight percent polyethylene monomer units and about 95 to 97 weight percent polypropylene monomer units. The random copolymers may be used with either polyethylene or polypropylene barrier layer 16. An exemplary random copolymer is sold under the trade designation 6D43 having approximately 3.2% ethylene units randomly distributed in a polypropylene backbone sold by Union Carbide of Houston, Tex.

Positioned between the low-strength nonwoven web 12 and high-strength nonwoven web 14 is the barrier layer 16. Desirably, the barrier layer 16 has a hydrohead value in excess of about 30 mbar and more desirable exceeding at least about 80 mbar. Desirably, the barrier layer 16 is also breathable, that is the barrier layer 16 allows water vapor to pass or migrate therethrough. In this regard, the barrier layer 16 may have an MVTR of at least about 100 $g/m^2/24$ hours and will desirably have a MVTR of greater than 1000 $g/m^2/24$ hours. For example, useful fabrics will have a MVTR ranging from about 2000 to about 5000 $g/m^2/24$ hours. Some fabrics may have MVTR values ranging as high as about 6000 to 7000 $g/m^2/24$ hours. Even greater MVTR values are desirable if it does not compromise the barrier properties of the composite fabric. Numerous materials are available which may include the barrier layer 16 such as, for example, films, foams, non-porous films, micro-porous films and micro-porous nonwoven materials. Most non-porous films act as a complete barrier to the passage of water and, thus, will create a non-breathable laminate. However, certain non-porous films, such as certain polyurethane films, act a barrier to liquids, such as water, yet allow water vapor to migrate therethrough. In addition, many meltblown webs having a basis weight of at least about 0.3 osy (10 gram per square meter (gsm)) exhibit the desired barrier properties and yet are breathable due to the porous structure of meltblown webs. Desirably such meltblown webs used in the present invention have a basis weight between about 0.3 osy (10 gsm) and about 1.5 osy (51 gsm). In reference to FIG. 3, the barrier layer 16 may include multiple layers 16a and 16b, such as two layers of meltblown webs.

Films which are rendered breathable, but which remain liquid-impervious, by the formation of microporous voids or openings sized to allow the transmission of water vapor therethrough are likewise known in the art. Breathable composite barrier fabrics 10 incorporating the latter type of breathable films are generally desired. These films may be rendered vapor permeable by adding filler particles to the film composition and either rolling or stretching the film causing fractures to form where the filler particles are located. The amount of filler within the film and the degree of stretching and/or rolling are controlled to impart the desired degree of vapor permeability. Use of such films in connection with the present invention allows for a breathable composite barrier fabric having an MVTR of at least about 100 $g/m^2/24$ hours and yet with a hydrostatic head of at least about 100 mbar. These films are typically formed from a polyolefin film, such as a polyethylene or polypropylene. Microporous breathable liquid-impervious films are discussed at greater length as disclosed in U.S. Pat. No. 4,777,073 issued to Sheth; U.S. Pat. No. 5,855,999 issued Jan. 5, 1999 to McCormack; and U.S. patent application Ser. No. 08/882,712 filed Jun. 25, 1997 to McCormack et al.; and U.S. patent application Ser. No. 08/929,562 filed Sep. 15, 1997, the entire contents of which are incorporated herein by reference. Additional breathable films and laminates with the requisite barrier properties may also be used in connection with the present invention for example U.S. Pat. Nos. 3,953,566 and 4,194,041 hereby incorporated by reference. A particularly desirable material for use in the present invention is a biaxially oriented linear low density polyethylene (LLDPE) film material which is about 50% to about 70% by weight calcium carbonate and which is commercially available from Exxon Chemical Patents, Inc. of Linden, N.J. under the trade name EXXAIRE. In a desired embodiment barrier layer 16 includes a microporous polyolefin film from about 0.5 to about 2 mils thickness. For example, the barrier layer 16 may include a 1 mil microporous linear low density polyethylene (LLDPE) film filled with about 50% by weight $CaCO_3$ and stretched in both the machine and cross-machine directions. Another exemplary polyolefin based film is disclosed in U.S. patent application Ser. No. 08/777,365, filed Dec. 27, 1996, and entitled, "Improved Cloth-Like, Liquid-Impervious Breathable Composite Barrier Fabric, which is hereby incorporated by reference. The film may have a basis weight varying from about 0.1 osy (3 gsm) to about 1 osy (30 gsm), and more desirably, about 0.25 osy (8.5 gsm).

The breathable composite barrier fabric 10 has a high-strength nonwoven web 14 to protect the barrier layer 16 and to provide strength to the overall fabric. The high-strength nonwoven web 14 should be composed of materials having good strength and abrasion resistance and which is capable of being attached to the other layers. It is contemplated that the high-strength nonwoven web 14 may include additional layers such as a woven web, knitted fabric or scrim material. The high-strength nonwoven web 14 may be a spunlaced or hydroentangled material, a bonded carded web, needle punched material or spunbond nonwoven web with the desired strength and abrasion characteristics. In a desired embodiment, the high-strength nonwoven web 14 is a spunbond web that is made of or includes multicomponent fibers. In one aspect, the high-strength nonwoven web 14 may include a layer of sheath/core spunbond fibers such as, for example, a continuous 50/50 sheath/core fibers wherein the sheath component includes polyethylene and the core includes component nylon-6. Alternatively, the high-strength nonwoven web 14 may include a layer of sheath/core spunbond fibers such as, for example, a continuous 50/50 sheath/core fibers wherein the sheath component includes polypropylene and the core component includes nylon-6. The high-strength nonwoven web 14 desirably has a basis weight of about 0.75 osy (25 gsm) to about 2.5 osy (85 gsm) and, more desirably, from about 1.0 osy (34 gsm) to about 2.0 osy (68 gsm).

Multicomponent fibers 20 desirably form the low-strength and high-strength nonwoven webs 12 and 14 of the laminate 10. These fibers may form a nonwoven web that may be hydroentangled, bonded and carded, needlepunched or a conventional spunbond or melt-spun web. Desirably multicomponent fibers 20 form an integrated nonwoven web of continuous spunbond fibers. As indicated above, spunbond fibers are generally not tacky when laid on a surface to form a web. It is usually necessary to impart additional integrity to the web by one or more means known in the art such as, for example, by point bonding, through-air bonding, HAK, hydroentangling, needle punching and/or adhesive bonding. Desirably the integrity is imparted to the web of spunbond fibers by thermal point bonding such as described in U.S. Pat. No. 3,855,046 to Hansen et al., the entire contents of which are incorporated herein by reference. In reference to FIG. 1, point bonds 18 create interfiber bonds between the spunbond fibers and impart integrity to the low-strength nonwoven web 12. Desirably, the material used in the nonwoven webs 12 and/or 14 has a basis weight between about 1 osy (30 gsm) and about 4 osy (140 gsm) and, more desirably, between about 1.5 osy (51 gsm) to about 3.5 osy (120 gsm). In a desired embodiment of the present invention, the nonwoven webs 12 and 14 include a 2.5 osy (85 gsm) point bonded web of 50/50 sheath/core spunbonded fibers or two layers of 1.25 osy (42.4 gsm) point bonded webs of 50/50 sheath/core spunbonded fibers. It is contemplated that the nonwoven webs 12 and/or 14 may also include a woven web, knitted fabric or scrim material.

The low-strength nonwoven web 12, barrier layer 16 and high-strength nonwoven web 14 collectively make up the breathable composite barrier fabric 10. Although the present description primarily discusses the use of three layers it will be appreciated by those skilled in the art that additional layers and/or inter-layers may be used in connection with the laminates discussed herein. Additional layers may be employed to increase the tensile strength, peel strength, barrier properties or other characteristics as desired. The multiple layers are laminated together to form a single cohesive fabric. Adhesion between the multiple layers may be achieved by various thermal bonding techniques known in the art such as, for example, ultrasonic bonding, thermal point bonding, conventional hot calendaring, hot air techniques, radiant heating, infrared heating and the like. While it is contemplated that adhesives may be used separately or in conjunction with thermal bonding to join the layers of the composite fabric, it is generally desirable to avoid adhesive bonding.

In situations where the combined basis weights of the nonwoven webs and barrier layer exceeds 3.0 osy (100 gsm) it will further be desirable to laminate the materials using ultrasonic bonding since at these higher basis weights thermal point bonded laminates may experience delamination due to poor peel strength. In reference to FIG. 4, bond points 24 are created, such as by application of thermal or ultrasonic energy, by melting the polymer compositions having a lower melting point. Desirably bonding is achieved by heating regions of the laminate above the melting point of the materials comprising the sheath component of the fibers comprising low-strength nonwoven web 12 and high-strength nonwoven web 14. Depending on the composition of the barrier layer, upon application of sufficient energy and pressure softening and/or melting of the polymer composition in the barrier material may also be achieved.

In the particular embodiment of FIG. 4, bond points 24 include a pattern of ultrasonic spot bonds. Typically the bond points themselves form non-breathable areas within the film. Thus, when employing breathable barrier layers it is desired that the bond area is less than about 50% of the surface area of the laminate and, more desirably, from about 5 to about 30% of the surface area. An exemplary ultrasonic bonding pattern is shown in FIG. 6 that creates a bond area of about 10–20%, desirably about 18%. However, numerous other bond patterns, such as those discussed above in the definitions section regarding thermal point bonding, may likewise be used in connection with the present invention.

Optionally, numerous UV stabilizers are known in the art may be added to the layers 12 and 14, and more specifically to component A of bicomponent fibers if they are used, in order to achieve UV stability. Examples of such stabilizers include, but are not limited to the following: 2-hydroxybenzophenones; 2-hydroxybenzotriazoles; hydroxybenzoates; metal chelate stabilizers; and hindered amine light stabilizers. An example of hydroxybenzoate stabilizers is 2,4-di-t-butylphenyl ester and those described in U.S. Pat. No. 3,206,431 hereby incorporated by reference. Metal chelate stabilizers are also known in the art and primarily include nickel complexes. Desirably, stabilizers used in the present invention are hindered amine light stabilizers that refer to a class of stabilizers including a cyclic amine moiety having no hydrogen atoms adjacent the nitrogen atom. Hindered amines are discussed in U.S. Pat. No. 5,200,443 to Hudson and numerous examples of such amines are commercially available, examples including those under the trade name HOSTAVIN N30 from Hoescht Celanese Corporation; CYASORB UV-3346 from Cytec Industries of West Patterson, N.J.; UVASIL-299 from Great Lakes Chemical Company of West Lafayette, Ind. and UVINOL 4049 from BASF. Particularly well suited hindered amines for use in the present invention are commercially available under the trade name CHIMASSORB 944 and CHIMASSORB 119 from the Ciba-Geigy Corporation of Hawthorne, N.Y. Typically the UV stabilizers are added to the polymeric composition prior to melt-spinning such as, for example, by incorporating the stabilizer in polymeric pellets used to produce the extrudate whereby each of the resulting conjugate fiber components has the desired amounts of UV stabilizer. It should be noted that hindered amine stabilizers having molecular weights above 1000, desirable between about 1000 and 5000, typically provide improved stabilization as compared to similar lower molecular weight stabilizers. Desirably the amount of hindered amine within the polymeric composition is between about 0.5% and about 3% by weight. However, the manner and amount of UV stabilizer added to the polymeric compositions will naturally vary with the particular polymer formulation and UV stabilizer selected.

In addition, pigments may also be added to the layers 12 and 14, and more particularly to component A of bicomponent fibers if they are used, in order to improve UV stability and/or to improve aesthetics of the resulting product. The choice of pigments may be selected for aesthetic and/or functional considerations. However, it will be appreciated that even simple organic pigments can have an adverse effect on UV stability. In this regard it may be advantageous to employ pigments which further enhance UV stability such as, for example, the use of metal oxide pigments in conjunction with hindered amine stabilizers; see U.S. Pat. No. 5,200,443 to Hudson and U.S. patent application Ser. No. 08/257,248 filed Jun. 8, 1994, the entire contents of which are incorporated herein by reference. In addition, other stabilization packages and/or methods of improving the UV stability may be used in connection with the present invention; as further examples see U.S. patent application Ser. No. 08/673,606 filed Jun. 25, 1996 and Ser. No. 08/562,722 filed Nov. 27, 1995, the entire contents of which are incorporated herein by reference. Further, the UV stability of the low-strength nonwoven web 12 may further be enhanced by applying a UV protective coating upon its exposed surface; see for example U.S. Pat. No. 4,818,600 and World Publication No. 96/25548 to DeLucia et al., hereby incorporated by reference.

Other materials may be added to the breathable composite barrier fabric 10 including but not limited to antistatic and alcohol repellency compositions. Exemplary antistatic compounds may include antistatic compounds sold under the trade designation ZELEC® by DuPont of Wilmington, Del. Alcohol repellency compounds may include repellency compounds sold under the trade designation REPEL-LANT® 7700 by DuPont of Wilmington, Del. Desirably these materials are only applied to the low-strength nonwoven web 12 and/or high-strength nonwoven web 14, although they may be applied to the barrier layer 16 as well.

The laminate of the present invention allows for the use of a wider array of materials while providing a barrier fabric that is strong and breathable. Moreover, the present invention provides a cohesive material with excellent attributes, such as a desired combination of high water barrier properties, good breathability and high tensile strength. By selecting polymers in the respective sheath components and film which have similar or identical melting points, thermal and/or ultrasonic bonding of the multiple layers will produce improved and well defined bond areas between both the sheath component of the layers and the barrier layer. For example, the sheath components and barrier layer may each include similar polymers such as for example, various polyethylene compositions and/or blends having similar melting points. In addition, it is believed that the present invention provides an improved laminate having a superior combination of strength and breathability.

Figure 7:
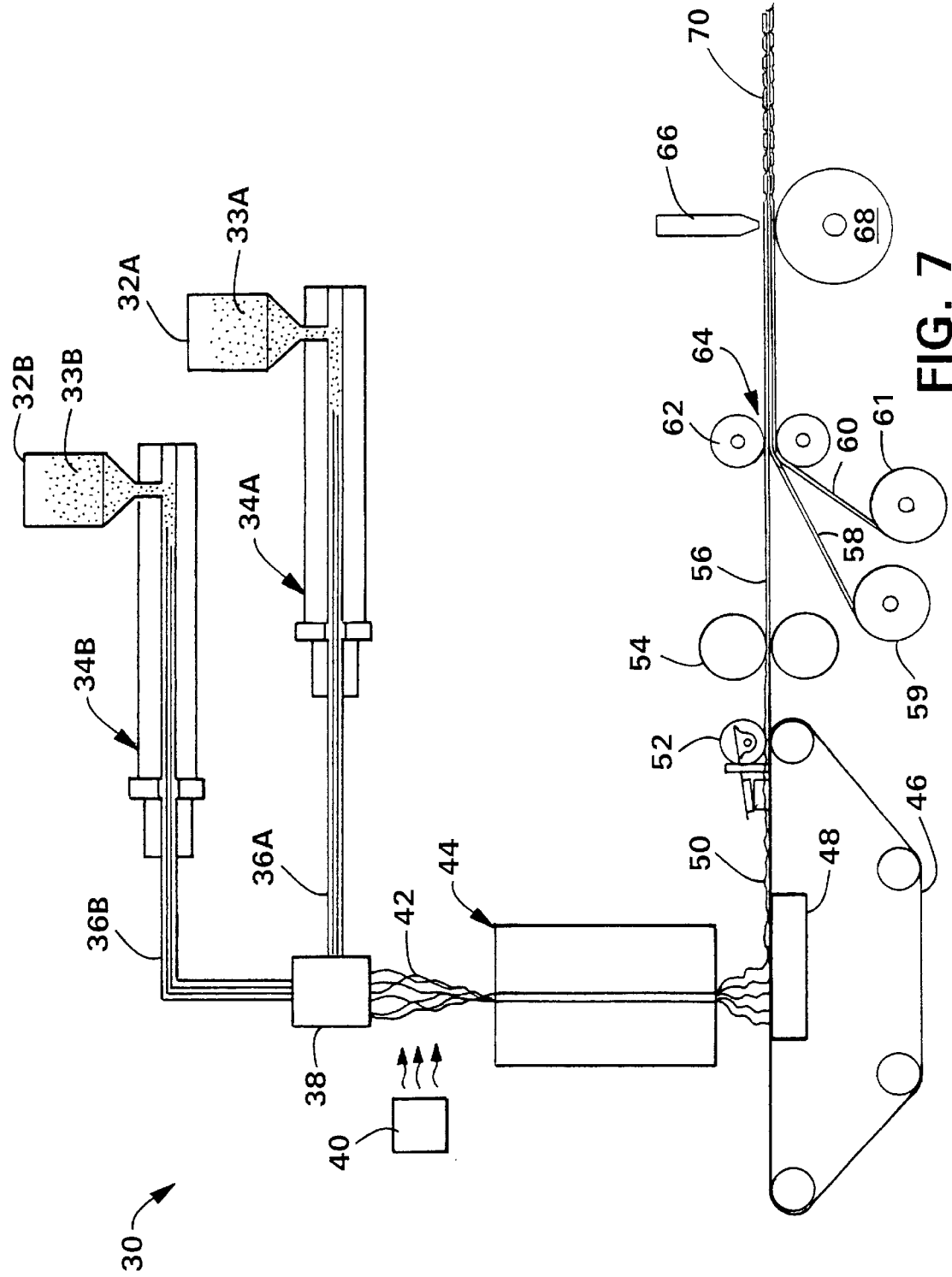
FIG. 7 is a schematic view of a process line for making the fabric of the present invention.

In reference to FIG. 7, a process line 30 for fabricating a breathable composite barrier fabric of the present invention is disclosed. Hoppers 32a and 32b may be filled with the respective polymeric components 33a and 33b. The polymeric components are then melted and extruded by the respective extruders 34a and 34b through polymer conduits 36a and 36b and through a spinneret 38. Spinnerets are well known to those skilled in the art and, generally, include a housing containing a spin pack which includes a plurality of plates stacked one on top of the another with a pattern of openings arranged to create flow paths for directing the polymeric components as desired. As the extruded filaments extend below the spinneret 38, a stream of air from a quench blower 40 quenches bicomponent filaments 42. The filaments 42 are drawn into a fiber draw unit or an aspirator 44 and then onto traveling a foraminous surface 46, with the aid of a vacuum 48, to form an unbonded layer of bicomponent spunbond fibers 50. The unbonded bicomponent fiber layer 50 may be lightly compressed by compression rollers 52 and then thermal point bonded by a patterned bonder-roller assembly 54 thereby creating a low-strength nonwoven web 56 of bonded bicomponent spunbond fibers. Those skilled in the art will appreciate that the spunbonded web could be made previously and wound on a supply roll and fed into the present process. A barrier layer 58 and a high-strength nonwoven web 60 of bicomponent bonded spunbond material may each be unrolled from respective supply rolls 59 and 61 and superposed with the low-strength nonwoven web 56 such that the barrier layer 58 is positioned between the two spunbond webs 56 and 60. The three layers 56, 58 and 60 may be fed through a nip 64 of a guide-roll assembly 62. The multiple superposed materials are then passed between a sonic horn 66 and a patterned anvil 68 to ultrasonically bond the material forming a breathable composite barrier fabric 70. Desirably the thicker layer, typically the high-strength nonwoven web 60, is facing the ultrasonic horn 66 in order to provide more protection for the barrier layer 58. Ultrasonic bonding is desirable for breathable composite barrier fabrics 70 greater than about 3 osy (100 gsm). Breathable composite barrier fabrics 70 less than about 3 osy (100 gsm) may instead be thermally bonded. The breathable composite barrier fabric 70 may then be wound on a winder roll (not shown), or alternatively, be cut to the desired dimensions and/or directly incorporated into a product as desired.

According to the present invention, the breathable composite barrier fabric may be used in the construction of protective garments. Exemplary protective garments and their methods of manufacture are disclosed in U.S. Pat. No. 5,487,189; U.S. Pat. No. 5,509,142; U.S. Pat. No. 5,770,529; and U.S. patent application Ser. No. 09/110,654 filed Aug. 26, 1997 by Debra Welchel et al.; all of which are commonly assigned and are incorporated herein by reference in their entirety.

For example, the breathable composite barrier fabric described above may be used in the construction of a protective garment that includes: (1) a body portion having a neck opening in a shoulder line at its top; (2) two sleeve portions extending from the body portion, each sleeve portion having an inner edge and an outer edge; and (3) two leg portions extending from the body portion.

As another example, the breathable composite barrier fabric described above may be used in the construction of a protective garment that includes: (1) a first body half and a second body half, said second body half being substantially a mirror image of said first body half, each said body half being composed of a seamless sheet of material wherein the low-strength nonwoven web is on the bodyside of the garment and the high-strength nonwoven web is on the exterior of the garment, and each body half including: (a) a body portion having a first and second edge and a top edge extending approximately half-way across the body portion from the top of the second edge; (b) a sleeve portion having a top and bottom sleeve edge, a top edge, and a segment of the second edge of the body portion; and (c) a leg portion having a front and a rear leg edge; (2) closure means joining the first edges of each bodyportion on each body half; (3) a seam joining the second edges of the body portion, including the segment of the second edges in the sleeve portions, on each body half; (4) sleeve seams joining the top sleeve edges to the bottom sleeve edges on each body half; (5) inseams joining the front leg edges to the back leg edges on each body half; and (6) back seams joining each top edge of a sleeve portion with the top edge of its respective body portion on each body half.

As yet another example, the breathable composite barrier fabric described above may be used in the construction of a protective in the form of coveralls containing a body piece composed of a single seamless sheet of material. The body piece has a right body side and a left body side. Each body side includes a first and second leg edge, a torso edge and a top body side edge extending approximately half-way across each body side from the respective torso edge. The body piece also includes a right sleeve portion and a left sleeve portion. Each sleeve portion has a first and second sleeve edge, and a top sleeve portion edge.

Generally speaking, the garment's construction includes approximately five seams and a closure. The closure joins the torso edge of right body side to the torso edge of the left body side to form a resealable opening at a rear face of the garment. In such a configuration, the protective garment can be described as rear-entry coveralls.

Sleeve seams join the first sleeve edges to the second sleeve edges on each sleeve portion and inseams join the first leg edges to the second leg edges on each body side. A back seam joins the top sleeve portion edge of the right sleeve portion at approximately the top body side edge of the right body side and the top sleeve portion edge of the left sleeve portion at approximately the top body side edge of the left body side. The back seam is located at the rear face of the garment. In some embodiments the back seam may be divided into two or more discrete seams.

In a particular embodiment, the closure means is adapted to join only a portion of the torso edge of right body side to only a portion of the torso edge of the left body side to form a resealable opening at a rear face of the garment. According to such an embodiment, the protective garment further include a seam joining a portion of the torso edge of the right body side to a portion of the torso edge of the left body side. This seam is located at the rear face of the garment.

Attachment of the various portions of the garment may be achieved utilizing sewing or stitching, ultrasonic bonding, solvent welding, adhesives, thermal bonding and similar techniques. The protective garments may also include features such as, for example, a collar, a hood, boots and/or elastic cuffs.

According to an aspect of the invention, the low-strength nonwoven web may be a hydrophobic nonwoven web that is hydrophilically transmuted utilizing an external wetting agent. The external wetting agent may be an applied surfactant treatment. The surfactant may be selected from anionic surfactants and cationic surfactants. Alternatively and/or additionally, the low-strength nonwoven web may be a hydrophobic nonwoven web that is hydrophilically transmuted by surface modification. The term "hydrophilically transmuted" refers to the condition in which a conventionally hydrophobic material has been rendered hydrophilic or water wettable. This may be accomplished by modifying the surface energies of the hydrophobic material utilizing wetting agents and/or surface modification techniques.

Generally speaking, materials such as, for example, fibers, filaments and/or fabrics (e.g., nonwoven fabrics and the like) formed of typically hydrophobic materials such as polyolefins may be rendered hydrophilic (i.e., water wettable) by use of internal wetting agents that migrate to the surface of the material, external wetting agents that are applied to the surface of the material, and/or surface modification techniques that alter the surface of the material. Exemplary external wetting agents include, for example, applied surfactant treatments. Useful surfactants may be selected from, for example, anionic surfactants and cationic surfactants. As an example, dioctylester of sodium sulfosuccinic may be used. Exemplary surface modification techniques include, for example, corona discharge treatments, chemical etches, coatings, and the like.

It is contemplated that the protective garments may be made from more than one type of fabric. For example, the garment may be made of a fabric with a breathable portion and a non-breathable portion. The non-breathable areas typically provide greater liquid barrier properties and thus are designed to be position in areas such as the front where leakage is likely to occur and the breathable sections designed to be positioned in those areas less susceptible to leakage during exposure, activity, or intense precipitation, such as the back or sides. Although such configurations may be used in connection with the present invention they need not be due to the excellent combination of breathability and liquid barrier properties provided by the present invention.

Test Procedures

Basis Weight Test

The basis weight of samples was determined in accordance with Federal Test Method No. 191A/5041. Sample size for the materials was 15.24 centimeters by 15.24 centimeters and five values were obtained for each material and then averaged.

The moisture vapor transmission rate (MVTR) sometimes also called the water vapor transmission rate (WVTR) for the sample materials was calculated in accordance with ASTM Standard E96-80. Circular samples measuring three inches (7.6 cm) in diameter were cut from each of the test materials and a control which was a piece of CELGARD™ 2500 film from Hoechst Celanese Corporation of Sommerville, N.J. CELGARD™ 2500 film is a microporous polypropylene film. Three samples were prepared for each material. The test dish was a number 60-1 Vapometer pan distributed by Thwing-Albert Instrument Company of Philadelphia, Pa. One hundred milliliters of water were poured into each Vapometer pan and individual samples of the test materials and control material were placed across the open tops of the individual pans. Screw-on flanges were tightened to form a seal along the edges of the pan, leaving the associated test material or control material exposed to the ambient atmosphere over a 6.5 centimeter diameter circle having an exposed area of approximately 33.17 square centimeters. The pans were placed in a forced air oven at 100° F. (32° C.) or 1 hour to equilibrate. The oven was a constant temperature oven with external air circulating through it to prevent water vapor accumulation inside. A suitable forced air oven is, for example, a Blue M Power-O-Matic 60 oven distributed by Blue M. Electric Company of Blue Island, Ill. Upon completion of the equilibration, the pans were removed from the oven, weighed, and immediately returned to the oven. After 24 hours, the pans were removed from the oven and weighed again. The preliminary test water vapor transmission rate values were calculated with Equation (I) below:

$$\text{Test MVTR} = (\text{grams weight loss over 24 hours}) \times 315.5 \text{ g/m}^2/24 \text{ hours} \quad (I)$$

The relative humidity within the oven was not specifically controlled.

Under the predetermined set conditions of 100° F. (32° C.) and ambient relative humidity, the MVTR for the CELGARD™ 2500 control has been defined to be 5000 grams per square meter for 24 hours (g/m²/24 hours). Accordingly, the control sample was run with each test and the preliminary test values were corrected to set conditions using Equation (II) below:

$$\text{MVTR} = (\text{Test MVTR/control MVTR}) \times (5000 \text{ g/m}^2/24 \text{ hours}) \quad (II)$$

Peel Strength Test

In this procedure, plies of a 4 inch (10.16 centimeter) by 6 inch (15.24 centimeter) fabric specimen are manually separated for a distance of approximately 2 inch (5.08 centimeter). The tested substrates had a minimum length of about 6 inch (15.24 centimeter). One layer of the specimen is clamped into a respective jaw of a constant rate of extension (CRE) unit or tensile tester and subjected to a constant rate of extension. The average peel strength required to separate the component layers of the fabric is determined and recorded as the peel strength of the specimen.

Special measures undertaken included maintaining a sharp die cutter. Sharpening a die may alter the actual cutting dimensions and subsequent test results. Therefore, the manufacturer was contacted for the recommended sharpening instructions. Furthermore, all edges on the specimen were cut clean and parallel.

The equipment included the CRE unit along with an appropriate load cell and computerized data acquisition system. An exemplary CRE unit is sold under the trade designation SINTECH 2 manufactured by Sintech Corporation, whose address is 1001 Sheldon Drive, Cary, N.C. 27513. The type of load cell was chosen for the tensile tester being used and for the type of material being tested. The selected load cell had values of interest fall between the manufacturer's recommended ranges, namely between 10 percent and 90 percent, of the load cell's full scale value. The load cell and the data acquisition system sold under the trade designation TestWorks™ may be obtained from Sintech Corporation as well. The equipment was calibrated by consulting the equipment manufacturer or their literature.

Additional equipment included pneumatic-actuated jaws, a weight hanging bracket, a die cutter, and masking tape. The jaws were designed for a maximum load of 5000 g and may be obtained from Sintech Corporation. The weight hanging bracket was a substantially flat bracket, which was inserted into the jaws during calibration or set-up. The die cutter was used with a 4 inch (10.2 cm) by 6 inch (15.2 cm) die. An exemplary die cutter or cutting press is sold under the trade designation SWING BEAM by USM Corporation of Atlanta, Ga. 30328. An exemplary die may be obtained from Progressive Service Die Co., of Jacksonville, N.C. 28546. Masking tape being 4 inches (10.2 cm) wide and sold under the trade designation TARTAN 200 may be obtained from the 3M Corporation of St. Paul, Minn. 55144.

Tests were conducted in a standard laboratory atmosphere of 23±2° C. (73.4±3.6° F.) and 50±5% relative humidity.

The specimens were cut with the die to a width of 4 plus or minus 0.05 inches (102 plus or minus 1 millimeters) and a length of at least 6 inches (152 millimeters (mm)).

The specimens were prepared by applying a 4-inch (102 millimeter) wide masking tape to the specimen. The tape was applied matching the width of the tape with the width of the substrate to completely cover the length of the substrate. Next, the tape was hand smoothed firmly to ensure an even attachment to the specimen. The tape was applied as one uniform piece and not as multiple pieces of tape.

The CRE was set-up with the following parameters. The load cell was chosen with the appropriate size such that the peak load value would fall between 10% and 90% of the full-scale load. The full-scale load varied depending on load cell. The crosshead speed was chosen at 12±0.4 inches/minute (min) (300+10 mm/min). The start measurement was at 16 plus or minus 1 mm and the end measurement was at 170 plus or minus 1 mm. The sample width was 4 plus or minus 0.04 inches (102 plus or minus 1 mm). The gage length was 2 plus or minus 0.04 inches (51 plus or minus 1 mm). The test result was reported in grams.

The computer data acquisition system was set to verify that the appropriate load cell and grip faces were in the constant rate extender. Next, the load cell was warmed-up for a minimum of 30 minutes. Afterward, the software was booted up. Next, the arrow keys were used to highlight the desired headings. Afterwards, the menu headings were followed to perform set-up.

The testing procedure included manually separating the plies of the specimen such that the barrier film layer and the high-strength nonwoven (i.e., the sheath/core polyethylene/polyamide) are peeled apart for a distance of approximately 2 inches (51 millimeters) along the length of the specimen to give a working area of 4 inches (102 millimeters). Initially, the specimen was manually peeled apart such that the film end of the substrate and the free end of the substrate easily inserted into each jaw. However, the tape was not peeled apart more than 2.5 inches (64 millimeters) because the test area would have been insufficient. The peeled, free end of the substrate was clamped in the moving jaw, while the peeled, free end of the film end was placed in the stationary jaw. The specimen was placed in the jaws straight and without slack.

Next, the crosshead was started. When the test was completed, the results were printed out, and included the average peel strength, which was reported.

Grab Tensile Test

The grab tensile test is a measure of breaking strength and elongation or strain of a fabric when subjected to unidirectional stress. This test is known in the art and conforms to the specifications of Method 5100 of the Federal Test Methods Standard 191A. The results are expressed in pounds or grams to break and percent stretch before breakage. Higher numbers indicate a stronger, more stretchable fabric. The term "peak load" means the maximum load or force, expressed in units of weight, required to break or rupture the specimen in a tensile test. The term "total energy" means the total energy under a load versus elongation curve as expressed in weight-length units. The term "elongation" means the increase in length of a specimen during a tensile test. The grab tensile test uses two clamps, each having two jaws with each jaw having a facing in contact with the sample. The clamps hold the material in the same plane, usually vertically, separated by 3 inches (76 mm) and move apart at a specified rate of extension. Values for grab tensile strength and grab elongation are obtained using a sample size of 4 inches (102 mm) by 6 inches (152 mm), with a jaw facing size of 1 inch (25 mm) by 1 inch, and a constant rate of extension of 300 mm/min. The sample is wider than the clamp jaws to give results representative of effective strength of fibers in the clamped width combined with additional strength contributed by adjacent fibers in the fabric. The specimen is clamped in, for example, a Sintech 2 tester, available from the Sintech Corporation, 1001 Sheldon Dr., Cary, N.C. 27513, an Instron Model TM, available from the Instron Corporation, 2500 Washington St., Canton, Mass. 02021, or a Thwing-Albert Model INTELLECT II available from the Thwing-Albert Instrument Co., 10960 Dutton Rd., Phila., Pa. 19154. This closely simulates fabric stress conditions in actual use. Results are reported as an average of multiple specimens and may be performed with the specimen in the cross direction (CD) or the machine direction (MD).

Trap Tear Test

The trapezoid or "trap" tear test is a tension test applicable to both woven and nonwoven fabrics. The entire width of the specimen is gripped between clamps, thus the test primarily measures the bonding or interlocking and strength of individual fibers directly in the tensile load, rather than the strength of the composite structure of the fabric as a whole. The procedure is useful in estimating the relative ease of tearing of a fabric. It is particularly useful in the determination of any appreciable difference in strength between the machine and cross direction of the fabric. In conducting the trap tear test, an outline of a trapezoid is drawn on a 3 by 6 inch (75 by 152 mm) specimen with the longer dimension in the direction being tested, and the specimen is cut in the shape of the trapezoid. The trapezoid has a 4 inch (102 mm) side and a 1 inch (25 mm) side which are parallel and which are separated by 3 inches (76 mm). A small preliminary cut of ⅝ inches (15 mm) is made in the middle of the shorter of the parallel sides. The specimen is clamped in, for example, an Instron Model TM, available from the Instron Corporation, 2500 Washington St., Canton, Mass. 02021, or a Thwing-Albert Model INTELLECT II available from the Thwing-Albert Instrument Co., 10960 Dutton Rd., Phila., Pa. 19154, which have 3 inch (76 mm) long parallel clamps. The specimen is clamped along the non-parallel sides of the trapezoid so that the fabric on the longer side is loose and the fabric along the shorter side taut, and with the cut halfway between the clamps. A continuous load is applied on the specimen such that the tear propagates across the specimen width. It should be noted that the longer direction is the direction being tested even though the tear is perpendicular to the length of the specimen. The force required to completely tear the specimen is recorded in pounds with higher numbers indicating a greater resistance to tearing. The test method used conforms to ASTM Standard test D1117-14 except that the tearing load is calculated as the average of the first and highest peaks recorded rather than the lowest and highest peaks. Multiple specimens for each sample should be tested.

EXAMPLE 1

A first nonwoven web of continuous 50/50 sheath/core spunbond fibers was made having a sheath component of linear low density polyethylene (Aspun® 6911a LLDPE from Dow Chemical Company, Midland, Mich.). The core component of the fiber included polypropylene (Escorene® 3445 from Exxon Chemical Company, Baytown, Tex.). The web of spunbond fibers was then patterned bonded with a wire weave pattern to form an integrated nonwoven web of bicomponent fibers having a basis weight of about 0.5 osy (17 gsm). The bond area was 14.8% with a pin size of 0.017 inch by 0.032 inch. A second nonwoven web of continuous 50/50 sheath/core spunbond fibers was made having a sheath component of linear low density polyethylene (Dow 6811a LLDPE). The core component of the fiber included nylon-6 (Nyltech 2169). The web of spunbond fibers was then patterned bonded with a wire weave pattern to form an integrated nonwoven web of bicomponent fibers having a basis weight of about 1.2 osy (41 gsm). A barrier layer was superposed between the first and second nonwoven sheets and ultrasonically bonded with the pattern shown in FIG. 6. The barrier layer included a 1 mil microporous linear low density polyethylene (LLDPE) film sold under the trade name EXXAIRE by Exxon Chemical Patents, Inc.

The resulting laminate was subjected to the above tests and the data appears in Table 1 below. All data points represent the mean of five specimens, except the WVTR, which represents the mean of three specimens. For purposes of comparison, the same testing was conducted on Tyvek® (Type 1442) material available from DuPont and the data reported below. The Tyvek® (Type 1442) material had a basis weight of approximately 1.2 ounces per square yard (OSY). It should be noted that the peel strength test was not applicable to this material because individual layers cannot be peeled apart. Three grades of SMS nonwoven fabrics were also tested. The SMS materials are available from Kimberly-Clark Corporation of Roswell, Ga. SMS-1 is a 1.3 osy polypropylene material (white in color) treated with an antistatic agent. SMS-2 is a 1.6 osy polypropylene material (denim colored) with an antistatic and alcohol repellant treatment. SMS-3 is a 1.8 osy polypropylene material with an antistatic and alcohol repellent treatment glazed on the material.

TABLE 1

| Material | Basis Weight (osy) | WVTR (g/m²/day) | Peel Strength (grams) | Trap Tear - CD 1st peak (lbs.) | Trap Tear - MD 1st peak (lbs.) | Grab Tensile - CD peak load (lbs.) | Grab Tensile - MD peak load (lbs.) |
|---|---|---|---|---|---|---|---|
| Example 1 | 2.5 | 3800 | 300 | 14 | 20 | 32 | 45 |
| SMS-1 | 1.3 | 4679 | N/A | 5 | 8.4 | 16 | 24 |
| SMS-2 | 1.6 | 4738 | N/A | 3.9 | 6 | 14 | 21 |
| SMS-3 | 1.8 | 4640 | N/A | 5.4 | 7 | 22 | 25.8 |
| Tyvek ® | 1.2 | 3000 | N/A | 4 to 5 | 4 to 5 | 18 to 21 | 18 to 21 |

As depicted in Table 1, the fabric laminate demonstrates sufficient breathability by having a WVTR greater than 3000 g/m2/24 hours and sufficient strength by Trap Tear (peak) values of at least 10 lbs. (CD) and at least 15 lbs. (MD) and Grab Tensile (peak) values of at least 30 lbs. (CD) and at least 40 lbs. (MD).

While the invention has been described in detail with respect to specific embodiments thereof, it will be apparent to those skilled in the art that various alterations, modifications and other changes may be made without departing from the spirit and scope of the present invention. It is therefore intended that all such modifications, alterations and other changes be encompassed by the claims.

We claim:

1. A breathable composite barrier fabric for protective garments, comprising:
    a low-strength nonwoven web;
    a high-strength nonwoven web including multicomponent fibers comprising a first polyolefin component and a second polyamide component, the high-strength web having a grab tensile strength of at least 1.5 times the low strength web; and
    a water impermeable barrier layer positioned between the low-strength web and high-strength web, the webs and barrier layer being joined by thermal bonding.

2. The breathable composite barrier fabric of claim 1 wherein the low-strength web is selected from the group consisting of spunbond webs, meltblown fiber webs, bonded carded webs, coform webs and combinations thereof.

3. The breathable composite barrier fabric of claim 2 wherein the low-strength web is a nonwoven web including multicomponent fibers having a sheath component and a core component.

4. The breathable composite barrier fabric of claim 2 wherein the low-strength web is a nonwoven web including multicomponent fibers having a side-by-side configuration.

5. The breathable composite barrier fabric of claim 1 wherein the high-strength web includes multicomponent fibers having a sheath component and a core component.

6. The breathable composite barrier fabric of claim 5 wherein the core component comprises a nylon and the sheath component a polyolefin.

7. The breathable composite barrier fabric of claim 1 wherein the high-strength web has a grab tensile strength of from about 2 to about 15 times the low strength web.

8. The breathable composite barrier fabric of claim 1 wherein the high-strength web has a grab tensile strength of from about 3 to about 9 times the low strength web.

9. The breathable composite barrier fabric of claim 1 wherein the high-strength web has a grab tensile strength of from about 4 times the low strength web.

10. The breathable composite barrier fabric of claim 1 wherein the barrier layer comprises a polyolefin meltblown web having a basis weight of at least about 10 grams per square meter.

11. The breathable composite barrier fabric of claim 1 wherein the barrier layer comprises a breathable film.

12. The breathable composite barrier fabric of claim 11 wherein the breathable film comprises a microporous polyolefin film.

13. The breathable composite barrier fabric of claim 11 wherein the breathable film comprises a multilayered filled film.

14. A protective garment formed from the breathable composite barrier fabric of claim 1, the protective garment comprising:
    a body portion having a neck opening in a shoulder line at its top;
    two sleeve portions extending from the body portion, each sleeve portion having an inner edge and an outer edge; and
    two leg portions extending from the body portion,
    wherein the low-strength nonwoven web is on the bodyside of the garment and the high-strength nonwoven web is on the exterior of the garment.

15. A protective garment formed from the breathable composite barrier fabric of claim 1, the protective garment comprising:
    a first body half and a second body half, said second body half being substantially a mirror image of said first body half, each said body half being composed of a seamless sheet of material wherein the low-strength nonwoven web is on the bodyside of the garment and the high-strength nonwoven web is on the exterior of the garment, and each body half including:
        a body portion having a first and second edge and a top edge extending approximately half-way across the body portion from the top of the second edge;
        a sleeve portion having a top and bottom sleeve edge, a top edge, and a segment of the second edge of the body portion; and
        a leg portion having a front and a rear leg edge;
    closure means joining the first edges of each bodyportion on each body half;
    a seam joining the second edges of the body portion, including the segment of the second edges in the sleeve portions, on each body half;
    sleeve seams joining the top sleeve edges to the bottom sleeve edges on each body half;
    inseams joining the front leg edges to the back leg edges on each body half; and
    back seams joining each top edge of a sleeve portion with the top edge of its respective body portion on each body half.

16. The breathable composite barrier fabric according to claim 1, wherein the low-strength nonwoven web is a hydrophobic nonwoven web that is hydrophilically transmuted utilizing an external wetting agent.

17. The breathable composite barrier fabric according to claim 16, wherein the external wetting agent is an applied surfactant treatment.

18. The breathable composite barrier fabric according to claim 17, wherein the surfactant is selected from anionic surfactants and cationic surfactants.

19. The breathable composite barrier according to claim 1, wherein the low-strength nonwoven web is a hydrophobic nonwoven web that is hydrophilically transmuted by surface modification.

20. A breathable protective garment comprising:

a body portion having a neck opening in a shoulder line at its top;

two sleeve portions extending from the body portion, each sleeve portion having an inner edge and an outer edge; and two leg portions extending from the body portion, the garment being constructed a breathable composite barrier fabric including:

a low-strength nonwoven web;

a high-strength nonwoven web including multicomponent fibers comprising a first polyolefin component and a second polyamide component, the high-strength web having a grab tensile strength of at least 1.5 times the low strength web; and a water impermeable barrier layer positioned between the low-strength web and high-strength web, the webs and barrier layer being joined by thermal bonding and configured so that the low-strength nonwoven web is on the bodyside of the garment and the high-strength nonwoven web is on the exterior of the garment.

21. The breathable protective garment of claim 20, wherein the low-strength nonwoven web is a hydrophobic nonwoven web that is hydrophilically transmuted utilizing an external wetting agent.

22. A breathable protective garment comprising:

a body portion having a neck opening in a shoulder line at its top;

two sleeve portions extending from the body portion, each sleeve portion having an inner edge and an outer edge; and two leg portions extending from the body portion, the garment being constructed a breathable composite barrier fabric including:

a low-strength nonwoven web;

a high-strength nonwoven web including multicomponent fibers comprising a first polyolefin component and a second polyamide component, the high-strength web having a grab tensile strength of at least 1.5 times the low strength web; and a water impermeable barrier layer positioned between the low-strength web and high-strength web, the webs and barrier layer being joined by thermal bonding and configured so that the low-strength nonwoven web is on the bodyside of the garment and the high-strength nonwoven web is on the exterior of the garment, and wherein the low-strength nonwoven web is a hydrophobic nonwoven web that is hydrophilically transmuted utilizing an external wetting agent.

* * * * *